United States Patent
Kohler et al.

(10) Patent No.: US 9,907,435 B2
(45) Date of Patent: Mar. 6, 2018

(54) MULTI-FUNCTIONAL OUTDOOR COOKING ASSEMBLY

(71) Applicant: L'ART DU JARDIN, Cernay (FR)

(72) Inventors: Christian Kohler, Cernay (FR); Kévin Kohler, Cernay (FR)

(73) Assignee: L'ART DU JARDIN, Cernay (FR)

( * ) Notice: Subject to any disclaimer, the term of this patent is extended or adjusted under 35 U.S.C. 154(b) by 358 days.

(21) Appl. No.: 14/406,102

(22) PCT Filed: Jun. 5, 2013

(86) PCT No.: PCT/FR2013/051273
§ 371 (c)(1),
(2) Date: Dec. 5, 2014

(87) PCT Pub. No.: WO2013/182808
PCT Pub. Date: Dec. 12, 2013

(65) Prior Publication Data
US 2015/0164278 A1    Jun. 18, 2015

(30) Foreign Application Priority Data
Jun. 5, 2012  (FR) ...................... 12 55199

(51) Int. Cl.
*A47J 37/07* (2006.01)
*A47J 37/06* (2006.01)

(52) U.S. Cl.
CPC ....... *A47J 37/0763* (2013.01); *A47J 37/0623* (2013.01); *A47J 37/0704* (2013.01); *A47J 37/0759* (2013.01)

(58) Field of Classification Search
CPC ................ A47J 37/0763; A47J 37/0759; A47J 37/0704; A47J 37/0623; F24B 1/003
USPC ....... 99/340; 126/1 R, 26, 41 D, 41 B, 39 H, 126/275 R, 25 AA, 25 R
See application file for complete search history.

(56) References Cited

U.S. PATENT DOCUMENTS

| | | | |
|---|---|---|---|
| 702,999 A | * | 6/1902 | Richards ................. F24B 1/182 126/299 R |
| D222,569 S | * | 11/1971 | Ford ............................ D23/350 |
| D228,609 S | * | 10/1973 | Tarsitano, Jr. ................. D7/333 |

(Continued)

FOREIGN PATENT DOCUMENTS

| | | |
|---|---|---|
| AT | 510 145 A4 | 2/2012 |
| AU | 2009202581 A1 | 1/2010 |

(Continued)

*Primary Examiner* — David Angwin
*Assistant Examiner* — Jimmy Chou
(74) *Attorney, Agent, or Firm* — Seed IP Law Group LLP

(57) ABSTRACT

The outdoor multifunction cooking set is composed of an oven mounted pivoting on a barbecue by means of a pivoting articulation. The barbecue includes an ashpit, a hearth and a cooking surface, while the oven includes a cooking bottom composed of refractory stones, and a door on the front face. The chamber of the oven has a double wall that is open at the bottom and is connected to a chimney mounted on the upper part of the oven and in communication with the hearth of the barbecue.

This cooking assembly includes at least one temperature maintenance chamber to be mounted, by means of one of its sides, on one hot side of the barbecue. This chamber incorporates a thermometer and an air outlet to be able to allow the hot air contained in it to escape.

19 Claims, 6 Drawing Sheets

(56) References Cited

U.S. PATENT DOCUMENTS

| | | | | |
|---|---|---|---|---|
| 3,937,138 | A | * | 2/1976 | Tidwell .................. A47J 37/067 126/25 R |
| 3,975,720 | A | * | 8/1976 | Chen ........................ F24C 7/02 219/712 |
| D267,769 | S | * | 2/1983 | Pope ............................. D7/332 |
| D301,107 | S | * | 5/1989 | Rocco ........................... D7/332 |
| 4,840,118 | A | * | 6/1989 | Rinehart ......................... 99/446 |
| 5,279,214 | A | * | 1/1994 | Lamendola ......... A47J 37/0704 126/25 A |
| 5,325,841 | A | * | 7/1994 | Hooper, Sr. ......... A47J 37/0704 126/25 R |
| 5,347,977 | A | * | 9/1994 | Lehikoinen ............... F24B 1/04 126/1 D |
| 5,515,774 | A | * | 5/1996 | Swisher ................ A47J 37/042 99/340 |
| 5,540,212 | A | * | 7/1996 | Stroud ................ A47J 37/0786 126/25 B |
| 5,711,209 | A | * | 1/1998 | Guines .................... F24B 1/207 126/25 R |
| 6,041,769 | A | * | 3/2000 | Llodra, Jr. .......... A47J 37/0759 126/197 |
| 6,178,965 | B1 | * | 1/2001 | Sulak ....................... F24B 1/181 126/25 R |
| 6,182,560 | B1 | * | 2/2001 | Andress .............. A47J 37/0718 126/25 R |
| 6,199,549 | B1 | * | 3/2001 | Yerkes .................... F24B 1/207 126/276 |
| 6,581,513 | B1 | * | 6/2003 | Prado Alvarez .... A47J 37/0759 126/25 R |
| 7,087,862 | B1 | * | 8/2006 | Shaffer ................. F24C 15/168 126/333 |
| 7,681,567 | B2 | * | 3/2010 | Chung ................ A47J 37/0704 108/117 |
| 7,686,010 | B2 | * | 3/2010 | Gustavsen ............... F24B 1/003 126/25 R |
| 7,856,971 | B2 | * | 12/2010 | Amaral ............... A47J 37/0704 126/25 A |
| D637,860 | S | * | 5/2011 | Petty .............................. D7/333 |
| 8,061,348 | B1 | * | 11/2011 | Rodriguez .............. F24B 1/182 126/1 B |
| 8,578,927 | B2 | * | 11/2013 | Gustavsen ............... F24B 1/003 126/1 R |
| 8,739,693 | B2 | * | 6/2014 | Stier ..................... A47J 37/041 99/421 H |
| 8,936,017 | B2 | * | 1/2015 | Holdo Baggott ..... A23L 1/0128 126/190 |
| 9,351,607 | B2 | * | 5/2016 | Pothetes ................. A47J 37/00 |
| 2001/0035176 | A1 | * | 11/2001 | Bush, III ............ A47J 37/0704 126/25 R |
| 2002/0148459 | A1 | * | 10/2002 | McCarty ............. A47J 37/0713 126/25 R |
| 2004/0112371 | A1 | * | 6/2004 | Le ........................... F24C 15/16 126/334 |
| 2004/0154611 | A1 | * | 8/2004 | Beech ....................... A21B 3/00 126/273 R |
| 2005/0109331 | A1 | * | 5/2005 | Chao .................... A47J 37/0781 126/25 R |
| 2006/0191528 | A1 | * | 8/2006 | Spangrud ........... A47J 37/0713 126/275 R |
| 2007/0221191 | A1 | * | 9/2007 | O'Brien .................... F24B 1/20 126/25 R |
| 2008/0098902 | A1 | * | 5/2008 | Mansfield ........... A47J 37/0786 99/339 |
| 2009/0145304 | A1 | * | 6/2009 | Yu ........................ A47J 37/0611 99/349 |
| 2010/0258106 | A1 | * | 10/2010 | Simms, II ........... A47J 37/0704 126/25 R |
| 2010/0258107 | A1 | * | 10/2010 | Davidson ................ F24B 1/207 126/276 |

FOREIGN PATENT DOCUMENTS

| | | |
|---|---|---|
| CH | 461 053 | 8/1968 |
| CH | 692 569 A5 | 8/2002 |
| FR | 2 519 538 A1 | 7/1983 |
| FR | 2 635 258 A1 | 2/1990 |
| GB | 1386376 * | 4/1971 |

* cited by examiner

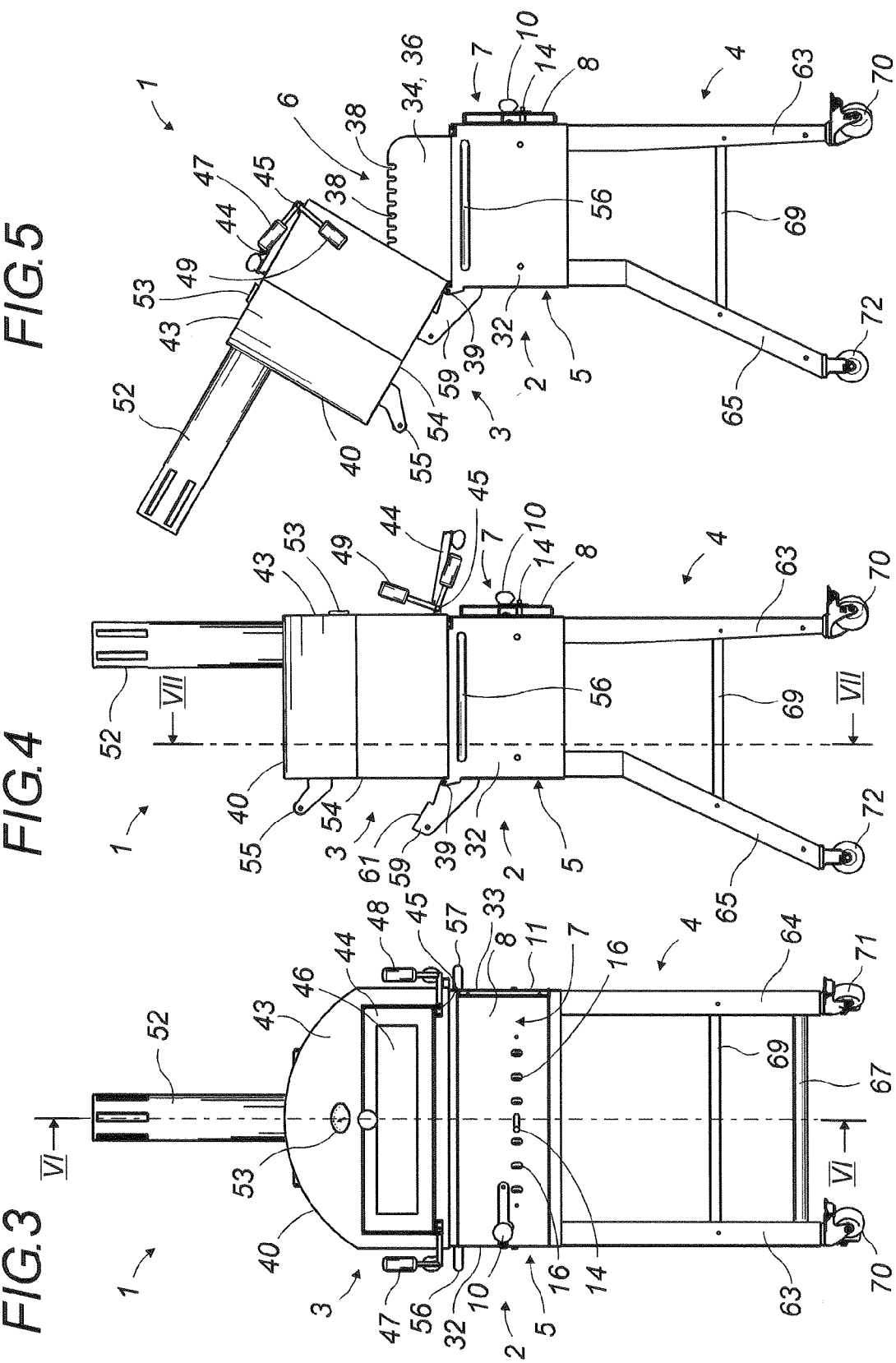

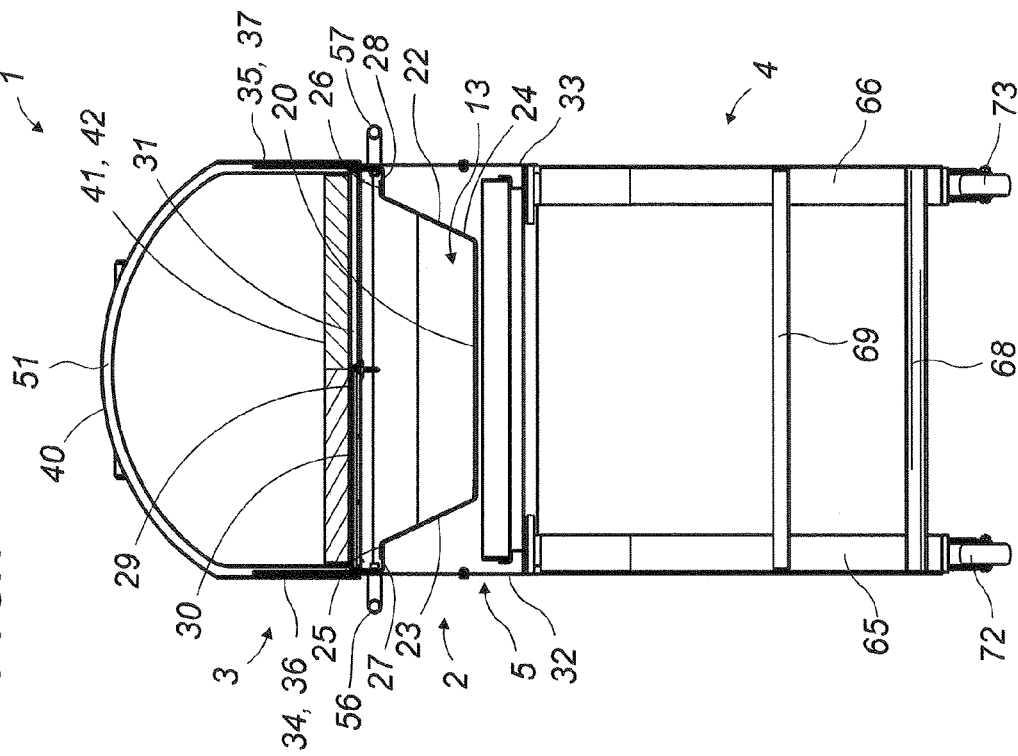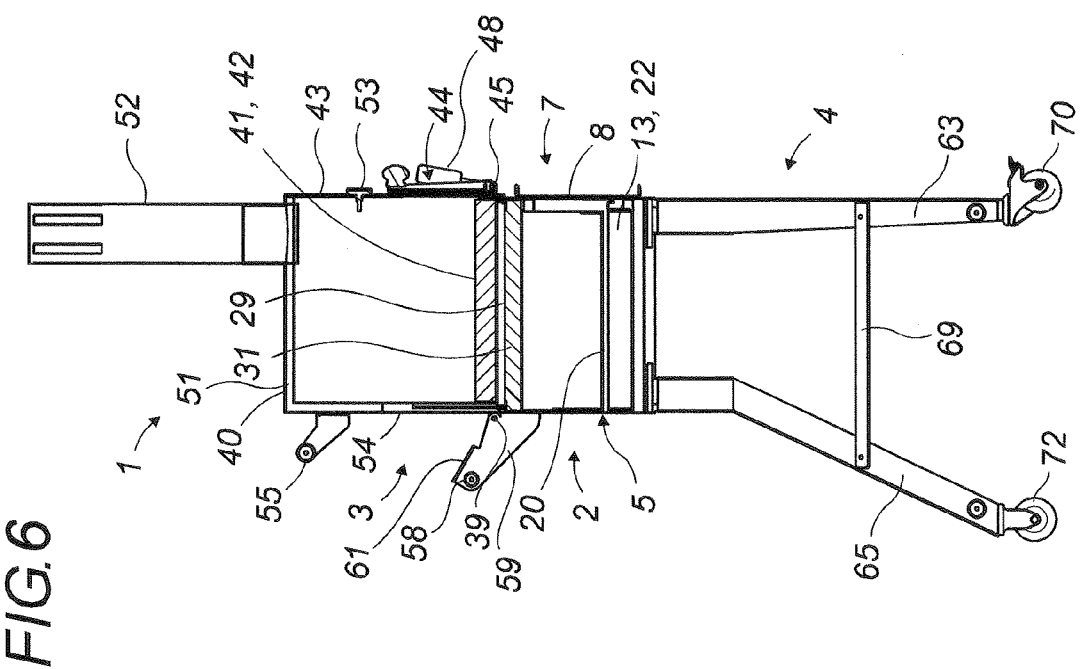

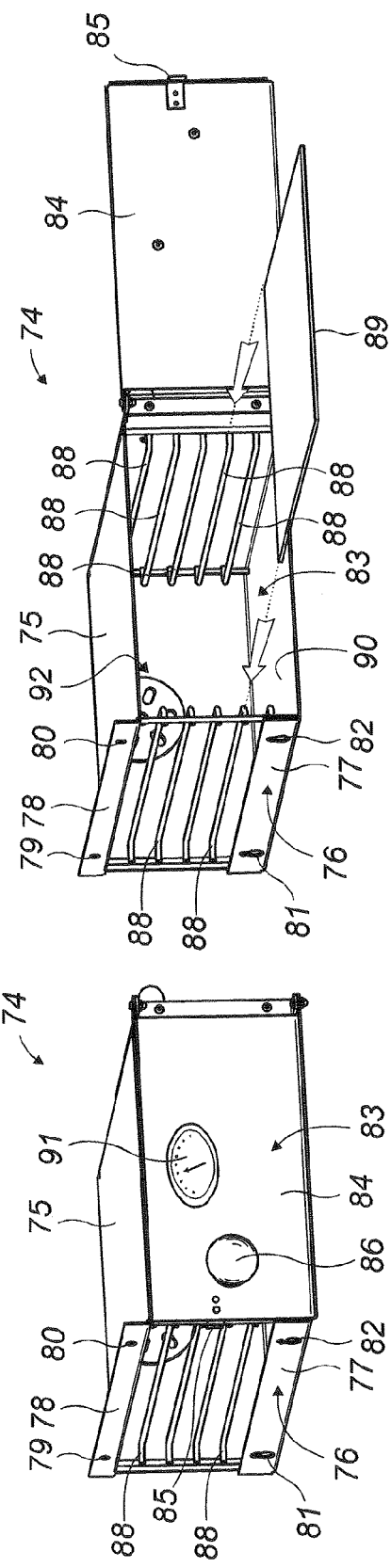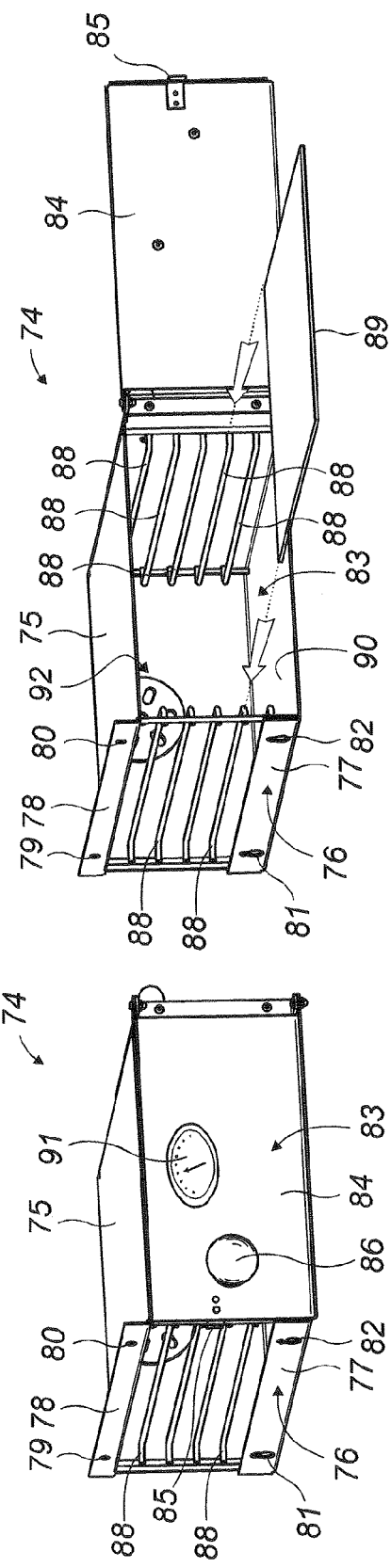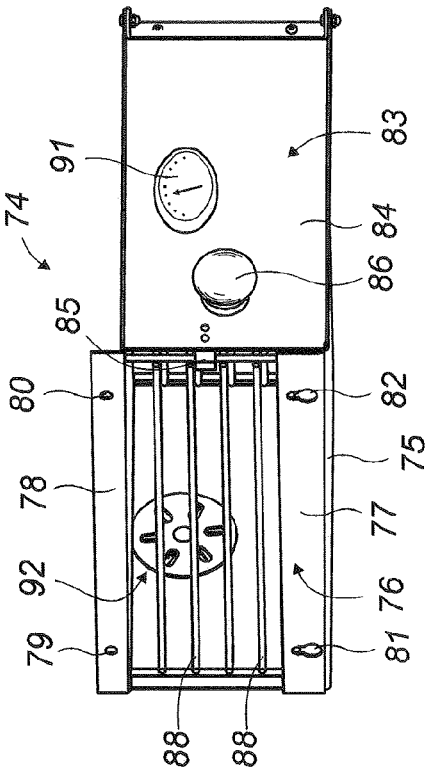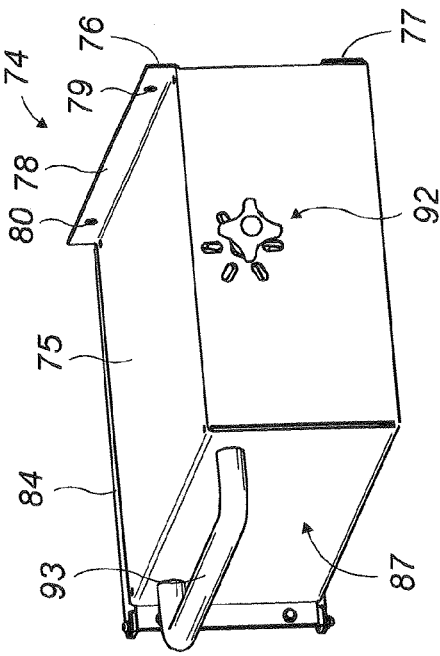

MULTI-FUNCTIONAL OUTDOOR COOKING ASSEMBLY

BACKGROUND

Technical Field

The present invention concerns an outdoor multifunction cooking set incorporating a barbecue and an oven—such as a pizza oven, a bread oven or an oven for tartes flambées. The barbecue and the oven are combined into one single appliance, and are heated by the same hearth, with the oven being mounted pivoting on top of the barbecue, such that it can be tipped backwards to free-up space allowing one to use the barbecue.

Description of the Related Art

These days, in the field of outdoor cooking appliances, there are many types of barbecues and ovens—such as pizza, ovens, bread ovens or ovens for tartes flambées. However, there is no outdoor cooking appliance that incorporates simultaneously a barbecue and an oven within the same mobile appliance, and that allows one to use either the barbecue or the oven in a satisfactory manner, with the possibility of using the two parts independently of each other, with each being heated by the same hearth.

Similarly, with regard to barbecues and ovens of pizza, bread or tarte flambée type, there is currently no device for maintaining the temperature of cooked foodstuffs that allows one to keep the cooked food hot while controlling they temperature so as to prevent them from continuing to cook and from drying out. Advantageously, such a device could be adapted for any multifunction cooking set incorporating a barbecue and/or an oven.

The problem for which the invention is designed to provide a solution is to provide a new type of outdoor multifunction cooking set that incorporates both a barbecue and an oven, both of which are heated by one single hearth, and also to provide a system for maintaining the temperature of cooked foodstuffs, that can be adapted to any outdoor cooking set incorporating a barbecue and/or an oven.

To cater to these various technical problems, there are already outdoor cooking appliances incorporating both a barbecue and an oven, but the design of these appliances is not satisfactory.

This is because some of these appliances require a hearth for each of their parts, constituting a simple voluminous juxtaposition that is difficult to move, being composed of a barbecue and an oven.

Others of these appliances do not enable one to use the oven or the barbecue under satisfactorily safe conditions when the other part has already been used and is still hot. Among these appliances, one can cite those of which one part—the oven or the barbecue, for example—must be separated and then moved before you can use the other part.

There are also covers mounted so as to pivot above the barbecue, allowing one to convert it into a heated enclosed space. However, the heated chamber is not a genuine oven—notably not a pizza, bread or tarte flambée oven—because it does not have a bottom in refractory stone on which the food can be cooked, it does not allow fumes to be evacuated, and it does not provide satisfactory cooking conditions for pizzas, bread or tartes flambées. The heated chamber obtained is more like a broiler than a genuine oven.

For barbecues, there are grills that can be placed in a raised position at a distance from the hearth, on which the cooked foodstuffs are placed so that they are kept hot before being served at the table. However, these grills are not a satisfactory solution, because they do not allow you to control the temperature of the foodstuffs placed on them and, often, when the food stays there too long a time, it ends up either going cold or drying out.

BRIEF SUMMARY

To solve the above-mentioned technical problems, the solution provided by the invention consists in providing an outdoor multifunction cooking set incorporating a conventional barbecue and an oven of pizza, bread or tarte flambée type, in which the barbecue and the oven are combined into one single appliance, and are heated by one single hearth.

The purposes of the invention are achieved by means of an outdoor multifunction cooking set composed of a barbecue and an oven, with the said set being mounted on a frame and comprising:

the barbecue, consisting of a chamber mounted on the frame, with an upper face and a front face of the said chamber being open, plus with a door mounted on the front panel in order to be able to close it, with the chamber of the barbecue comprising an ashpit at the bottom, a hearth mounted above the ashpit, and a cooking surface on the open upper surface of the said chamber;

the oven, consisting of a metal chamber of which the bottom is fitted with refractory stones acting as a cooking and thermal inertia surface, and a chimney mounted on the upper part of the oven, with the metal chamber incorporating:

a front face with a closing door;

characterized in that the oven mounted movably on the barbecue by means of a connection allowing one to change its position in relation to the barbecue, by moving the said oven between a working cooking position above the barbecue and a position giving access to the barbecue's cooking surface.

The cooking surface is, for example, composed of a grill and/or a so-called "plancha" plate.

According to one example of implementation of the outdoor multifunction cooking set in accordance with the invention, the oven is mounted movably on the barbecue by means of a pivoting articulation.

According to one example of implementation of the outdoor multifunction cooking set in accordance with the invention, the oven is mounted pivoting to the rear by means of the pivoting articulation, which has an essentially-horizontal pivoting axis.

According to one example of implementation of the outdoor multifunction cooking set in accordance with the invention, the pivoting articulation is fixed to the rear upper edge of the barbecue chamber.

According to another example of implementation of the outdoor multifunction cooking set in accordance with the invention, the oven is mounted on the barbecue by means of connection components allowing the pivoting of the said oven around an essentially-vertical pivoting axis.

According to another example of implementation of the outdoor multifunction cooking set in accordance with the invention, the oven is mounted on the barbecue by means of sliding components allowing the oven to slide from the working cooking position to the position giving access to the cooking surface, and vice versa.

According to one example of implementation of the outdoor multifunction cooking set in accordance with the invention, the chamber of the oven has a double wall, except at its front face and bottom, with the double wall being, firstly, open at the bottom and, secondly, connected to the chimney and in communication with the barbecue hearth.

According to one example of implementation of the outdoor multifunction cooking set in accordance with the invention, the chamber of the barbecue has side walls extended by side panels providing a mounting for a rotating spit.

According to one example of implementation of the outdoor multifunction cooking set in accordance with the invention, the chimney is positioned off-center towards the front.

According to one example of implementation of the outdoor multifunction cooking set in accordance with the invention, the barbecue comprises a horizontal bar on its rear face, with the upright sections of the aforesaid horizontal bar being horizontal or oblique and also acting as a travel limiter system for the oven in the tipped position.

According to one example of implementation of the outdoor multifunction cooking set in accordance with the invention, the uprights of the said horizontal bar comprise thrust lugs designed to act as a thrust point for the rear face of the oven when it is tipped backwards.

According to one example of implementation of the outdoor multifunction cooking set in accordance with the invention, the oven can be tipped backwards by means of the pivoting articulation, to a tilt angle preferably between 50° and 70°. Obviously, the inclination of the uprights is designed in a corresponding manner.

The frame includes, for example, four vertical feet fixed to the hearth by their upper end. The rear feet are advantageously tilted to the rear.

According to one example of implementation in accordance with the invention, the outdoor multifunction cooking set comprises at least one temperature maintenance chamber.

According to one example of implementation of the outdoor multifunction cooking set in accordance with the invention, the temperature maintenance chamber comprises a metal chamber to be mounted or to be fixed by one of its sides on a hot side of the barbecue, with a door allowing access to the interior of the metal chamber.

According to one example of implementation of the outdoor multifunction cooking set in accordance with the invention, the chamber fixing side is open or closed, either partially or totally.

According to one example of implementation of the outdoor multifunction cooking set in accordance with the invention, the chamber fixing side incorporates horizontal edges designed with apertures for its securing.

According to one example of implementation of the outdoor multifunction cooking set in accordance with the invention, the vertical sides of the chamber located on each side of the door comprise horizontal mountings for horizontal shelves designed holding pizzas, tartes flambées or other foodstuffs.

According to one example of implementation of the outdoor multifunction cooking set in accordance with the invention, the horizontal shelves are positioned in a removable manner on the horizontal mountings.

According to one example of implementation of the outdoor multifunction cooking set in accordance with the invention, the temperature maintenance chamber comprises a thermometer that displays the temperature within it, and an air outlet designed to be operated by the user so as to allow the hot air contained in the chamber to escape.

The oven of the invention is a veritable oven, for example, for pizza, bread or tarte flambée. It incorporates a closed metal chamber with a bottom fitted with refractory stones, with this chamber being closed on its front face by a tipping door.

For its heating, the oven has passages for fumes from the hearth of the barbecue, for evacuating them through the chimney. These lateral passages advantageously serve as a housing for supporting side panels for the barbecue's rotary spit when the oven is moved above the barbecue, which avoids having to dismount these supporting side panels when one wants to use the oven.

Through its assembly, the oven, according to one example of implementation, can be tipped backwards, which allows easy and full access to the barbecue located underneath.

Another advantage of the cooking set in accordance with the invention resides in the fact that, even in the rearward-pivoted position, the double wall captures a considerable part of the combustion and cooking fumes from the barbecue, and exhausts them through the chimney.

The cooking set according to the invention is compact, easily movable/transportable, is made of metal, and has castors.

In the stored position—namely when the oven part is retracted onto the barbecue part, the assembly is closed and protected from rain and soiling by the upper part of the oven, which allows one to leave it in situ—for example, when it is still very hot or when the user does not want to store it away from bad weather.

To keep the cooked foodstuffs hot, the cooking set can incorporate a chamber to be mounted or fixed on a hot side—for example, against the side of the barbecue. The air contained within it is then heated by radiation, which keeps the food inside hot. A thermometer allows one to check whether the temperature inside the chamber is not too high, and an air exhaust system can be operated to allow the hot air to exit if the temperature inside the chamber is too high. Trays can be placed in the chamber for holding pizzas, tartes flambées or other foodstuffs, so as to keep them hot.

BRIEF DESCRIPTION OF THE SEVERAL VIEWS OF THE DRAWINGS

Other characteristics and advantages of the invention will come to the fore on reading the detailed description that follows. This description refers to the appended drawings, in which:

FIG. 3 is a front view corresponding to FIG. 1;

FIG. 4 is a side view corresponding to FIG. 1;

FIG. 5 is a side view corresponding to FIG. 2;

FIGS. 6 and 7 are vertical sectional views of the outdoor multifunction cooking set according to the invention;

FIGS. 10 to 13 are overviews in perspective of the food temperature maintenance chamber according to the invention, with FIG. 13 being a view from the rear;

DETAILED DESCRIPTION

Figure 1:
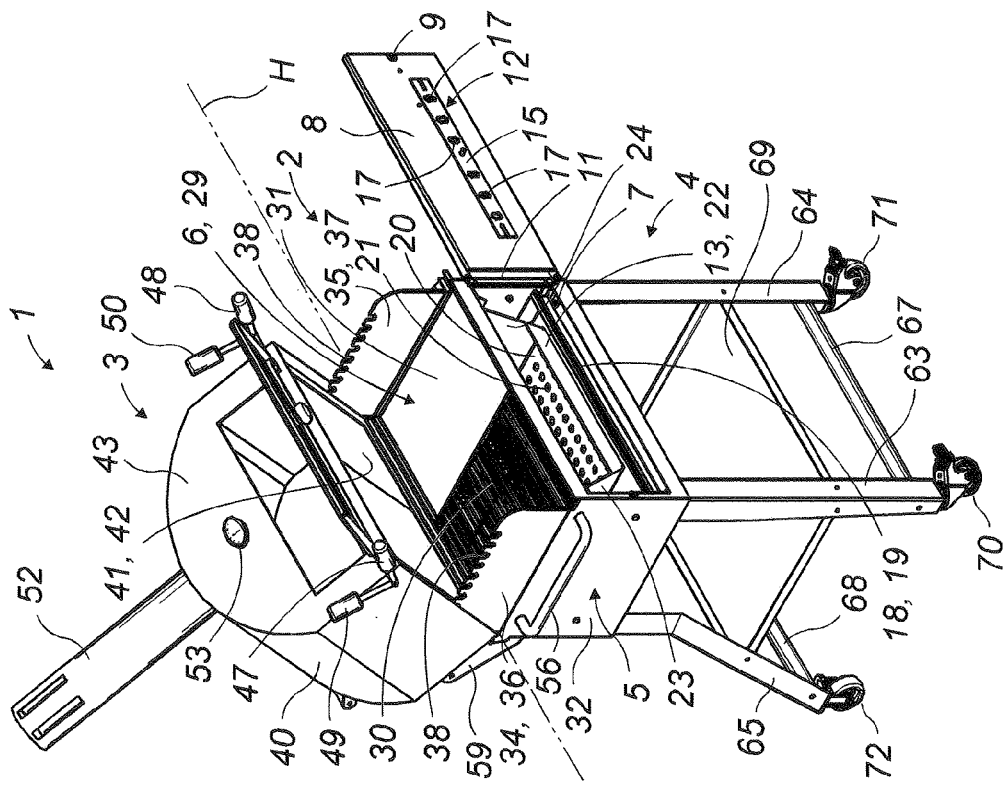
FIG. 1 is an overview in perspective of the outdoor multifunction cooking set of the invention, in the oven usage position.
Figure 2:
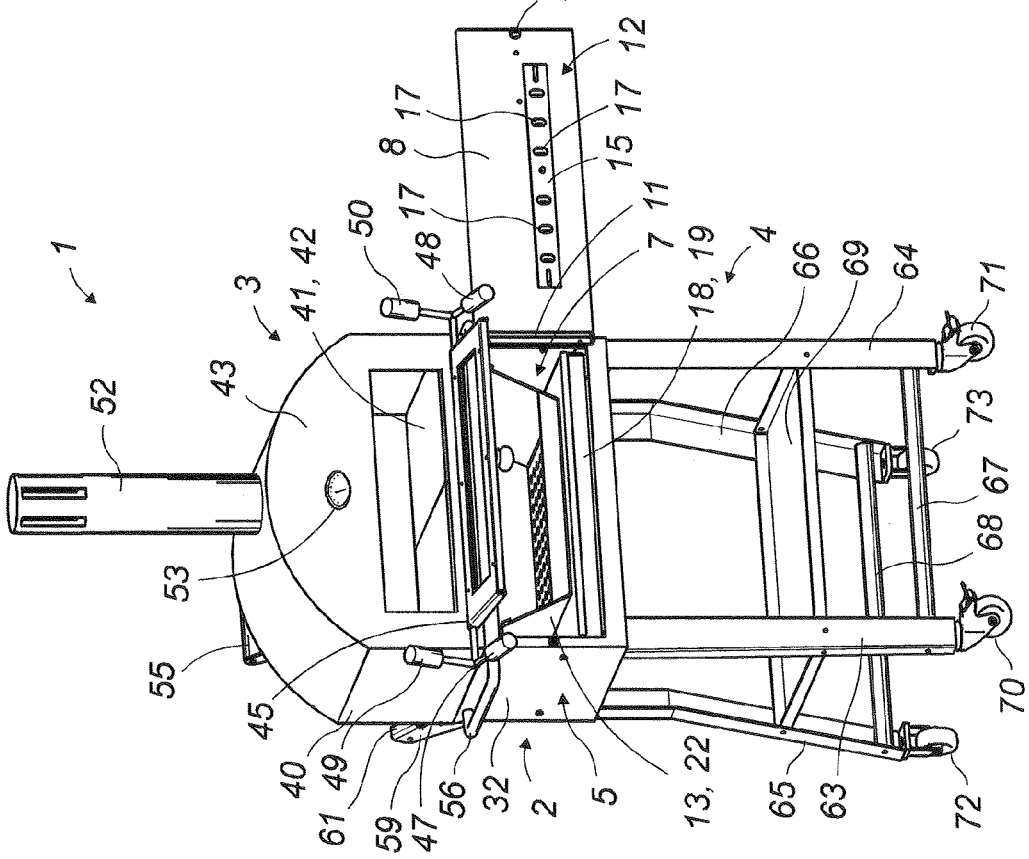
FIG. 2 is an overview in perspective of the outdoor multifunction cooking set of the invention, in the barbeque usage position.

The outdoor multifunction cooking set according to the present invention is described below in detail, with reference to FIGS. 1 to 15.

Structurally- and functionally-identical components are assigned the same numeric or alphanumeric reference in the various Figures.

This multifunction assembly 1 consists of a barbecue and an oven 3, with the assembly being mounted on a frame 4.

The barbecue 2 of the multipurpose cooking set 1 according to the invention incorporates a chamber 5 mounted on the frame 4. This chamber 5 is preferably rectangular and made of metal. Its upper face 6 and front face 7 are open; a door 8 is mounted on the front face 7, so that it can be closed. This door 8 has for example a closure system 9 and a handle 10, and is pivotally mounted on an articulation 11 fixed laterally on the front face 7 of the chamber 5 of the barbecue 2. The said door 8 has a damper 12 for the hearth 13. This damper 12 includes a gripping projection 14 integral with a slide bar 15 located in front of a series of horizontal apertures 16 in the door 8. The slide bar 15 also has a series of horizontal openings 17 that are located in front or that partially or fully cover the openings 16 of the door 8, for adjustable admission of air to regulate the fire draft. By laterally sliding the slide bar 15 by means of the gripping projection 14, the openings 16 formed in the door 8 can be closed or opened, completely or partially, depending on the drawing effect desired for the hearth and the desired temperature.

At its bottom, the chamber 5 of the barbecue 2 includes an ashpit 18—for example, in the form of a metal drawer 19 mounted so as to slide, that can be removed via the front face 7 of the chamber 5 of the barbecue 2, in order to empty it.

The chamber 5 of the barbecue 2 also includes a hearth 13 mounted above the ashpit 18. The bottom 20 of this hearth 13 has perforations 21 for the passage of cinders. By opening the door 8 of the front of the barbecue 2, it is possible to gain access to the hearth 13 to insert fuel— preferably wood or charcoal. This hearth 13 takes the form of a perforated plate 22 mounted inside the chamber 5 of the barbecue 2, via the sides 23, 24, which extend upwards obliquely so as to be accommodated by sliding, for example, via their free side edges 25, 26, within slides, or on salient horizontal mountings 27, 28 provided on the side within the barbecue's 2 chamber 5.

At its top, at its open face 6, the chamber 5 of the barbecue 2 incorporates a cooking surface 29. This is removable for cleaning or replacement. This cooking surface 29 can be composed of a grill 30, a so-called "plancha" plate 31, or both. In the drawings, which are provided solely as an example, the barbecue 2 of the multifunction cooking assembly 1 according to the invention includes a cooking surface 29 composed of a grill 30 on the left and a "plancha" plate 31 on the right.

The grill 30 and/or "plancha" plate 31 are preferably detachable and interchangeable, so that the user can easily configure the barbecue 2 of the invention according to his/her personal needs and tastes. These cooking surface components 29 can be in one piece or several pieces.

Because the ashpit 18, the hearth 13 and the cooking surface components 29 are all detachable, it is very easy to maintain and clean the barbecue 2 according to the invention.

The sides 32, 33 of the barbecue's 2 chamber 5 can be extended by supporting side panels 34, 35 for a rotary spit. They are preferably vertical metal plates 36, 37 with notches 38 distributed over their upper edge, so as to be able to accommodate a cooking spit (not illustrated).

The oven 3 is mounted on the barbecue 2 by means of a connection system allowing its position to be modified in relation to the barbecue 2, to free-up the cooking surface 29.

The oven 3 of the multifunction cooking set 1 according to the invention is preferably mounted articulated on the barbecue 2 so as to free-up the barbecue's 2 cooking surface in a distanced position.

For example, the oven 3 is mounted pivoting on the barbecue 2 by means of a pivoting articulation 39. This pivoting articulation 39 can be fixed on the rear upper edge of the chamber 5 of the barbecue 2, so that the oven 3 pivots backwards.

The oven 3 includes a metal chamber 40 of which the bottom 41 is fitted with refractory stones 42 so as to serve as a cooking surface for pizzas, tartes flambées, bread or any other foodstuff habitually cooked in an oven of bread or pizza type. These refractory stones 42 also provide thermal inertia.

The front face 43 of the chamber 40 of the oven 3 is closed by a door 44 mounted so as to tip downwards at the bottom of the chamber 40 of the oven 3, by means of a pivoting articulation 45 of hinge type. This tipping door 44 incorporates a window 46 for visibility inside the 3. Handles for opening and closure 47, 48, incorporating—for example—a gripping part in wood are fixed on each side of the tipping door 44, in immediate proximity to the pivoting articulation 45. These handles 47, 48 are located in a plane parallel to that of the tipping door 44 of the chamber 40 of the oven 3. Counterweights 49, 50 are secured perpendicularly to the base of each of these handles 47, 48. In the closed position of the tipping door 44, these counterweights 49, 50 are essentially horizontal and located to the rear (see FIGS. 8 and 9), whereas they are essentially vertical and located towards the top when the tipping door 44 is tipped forwards in the open position (see FIG. 1). When the tipping door 44 is tipped upwards in the closed position, the weight of the counterweights 49, 50 exerts a force of return to the rear for the tipping door 44, which presses the tipping door 44 into the position of being closed against the opening in the oven.

As can be seen in FIGS. 6 and 7, the metal chamber 40 of the oven 3 has a dual wall 51, except at its front face 43 and its bottom 41. This double wall 51 is connected to a chimney 52 mounted on the upper part of the oven 3, in communication with the barbecue's 2 hearth 13. The said double wall 51 is thus designed so that the exiting of the fumes from the hearth 13 causes them to pass within the double wall 51 before being evacuated via the chimney 52. This circulation of the fumes heats the chamber 40 of the oven 3 without passing through its interior volume.

This double wall 51 is open at the bottom, whereas the chamber 40 of the oven 3 is essentially of the same width and length as the barbecue 2, and the chamber 40 of the oven 3 is mounted centered on that of the barbecue 2; thus, the supporting side panels 34, 35 for the barbecue's 2 rotary spit are accommodated in the side parts of the double wall 51 when the oven 3 is moved above the barbecue 2.

The chimney 52 is positioned off-centered to the front so that when the oven 3 is tipped towards the rear, the entry of this chimney 52 is essentially above the barbecue 2 and in the middle of it, so as to guide the fumes from the hearth 13. Thus, even when tipped to the rear, the oven 3 is useful for the operation of the barbecue 2.

On its front panel 43, the oven 3 can incorporate a thermometer 53 that displays the temperature inside the oven 3.

On its rear face 54, the oven 3 has a rear handle 55 that notably allows one to tip it backwards and move the assembly.

Similarly, on its lateral faces, the outdoor cooking set 1 according to the invention can incorporate lateral handles 56, 57 that allow one to move it and/or hang cooking utensils on it.

On its rear face, the barbecue 2 can incorporate a horizontal bar 58 notably allowing one to move the outdoor multifunction cooking set 1, with the uprights 59, 60 of this horizontal bar 58 being horizontal or oblique and also acting as a travel limiter system for the oven 3 in the tipped position. For this purpose, the uprights 59, 60 of the said horizontal bar 58 incorporate thrust lugs 61, 62, for instance, tilted 60° rearwards in relation to horizontal, these thrust lugs 61, 62 being designed to act as a thrust point for the rear face 54 of the oven 3 when it is tipped rearwards—for instance, at 60° in relation to horizontal. This angle of tilt of around 60°—preferably between 50° and 70°—is preferred in that it frees-up the space allowing one to use the barbecue 2, while not moving the center of gravity of the outdoor multifunction cooking set 1, which could result in a precarious equilibrium and a risk of overturning of the cooking set 1. Obviously, it is evident for a professional to adapt the outdoor multifunction cooking set 1 to allow other angles of tilt.

The chassis 4 of the outdoor multifunction cooking set 1 according to the present invention is composed of four vertical feet 63, 64, 65, 66 that can be interconnected by transversal reinforcement tubes 67, 68. A storage shelf can be mounted between these feet 63, 64, 65, 66. The rear feet 65, 66 are preferably inclined rearwards to give the outdoor cooking set 1 of the invention a good stability when the oven 3 is tipped backwards.

The four vertical feet 63, 64, 65, 66 are fixed to the hearth 13 by their upper end, while their lower ends are fitted with castors 70, 71, 72, 73 for moving the multifunction cooking set 1 of the invention. The front castors 70, 71 are preferably swiveling, and are fitted with a brake to block their rotation, so as to immobilize the multifunction cooking set 1.

The outdoor multifunction cooking set 1 according to the present invention can incorporate at least one temperature maintenance chamber 74. This temperature maintenance chamber 74 includes a metal chamber 75 to be mounted or fixed by one of its sides 76 on a hot side—for example, against one or both sides of the barbecue 2. The securing side 76 of the chamber 74 is designed to be mounted on one hot side, and can be opened or closed, totally or partially. In FIGS. 10 to 13, it is represented partially open, with horizontal edges 77, 78 equipped with apertures 79, 80, 81, 82 for its securing—for example, against the side of the barbecue 2.

Since the temperature maintenance chamber 74 of the invention can be mounted on any hot side of an outdoor cooking set 1, its securing side 76 can have any shape and any configuration that is suitable for its assembly. Thus, as an example, if the temperature maintenance chamber 74 of the invention must be mounted on a convex side of an outdoor cooking set 1, the securing side 76 via which it is mounted on this set 1 must consequently be correspondingly concave.

One face of the temperature maintenance chamber 74—preferably its front face 83—has a door 84 allowing access to the interior of the metal chamber 75. This door incorporates a closure system 85 and a handle 86.

The vertical sides 76, 87 of the chamber located each side of this door 84 can incorporate horizontal mountings 88 for horizontal shelves 89 designed for placing pizzas, tartes flambées or other foodstuffs on them in view of keeping them hot. The horizontal shelves are placed in a removable manner on these horizontal mountings, which notably allows them to be removed for cleaning.

One can also envision similar horizontal shelves being fixed within the temperature maintenance chamber 74, or simply brackets supporting removable shelves.

Figure 8:
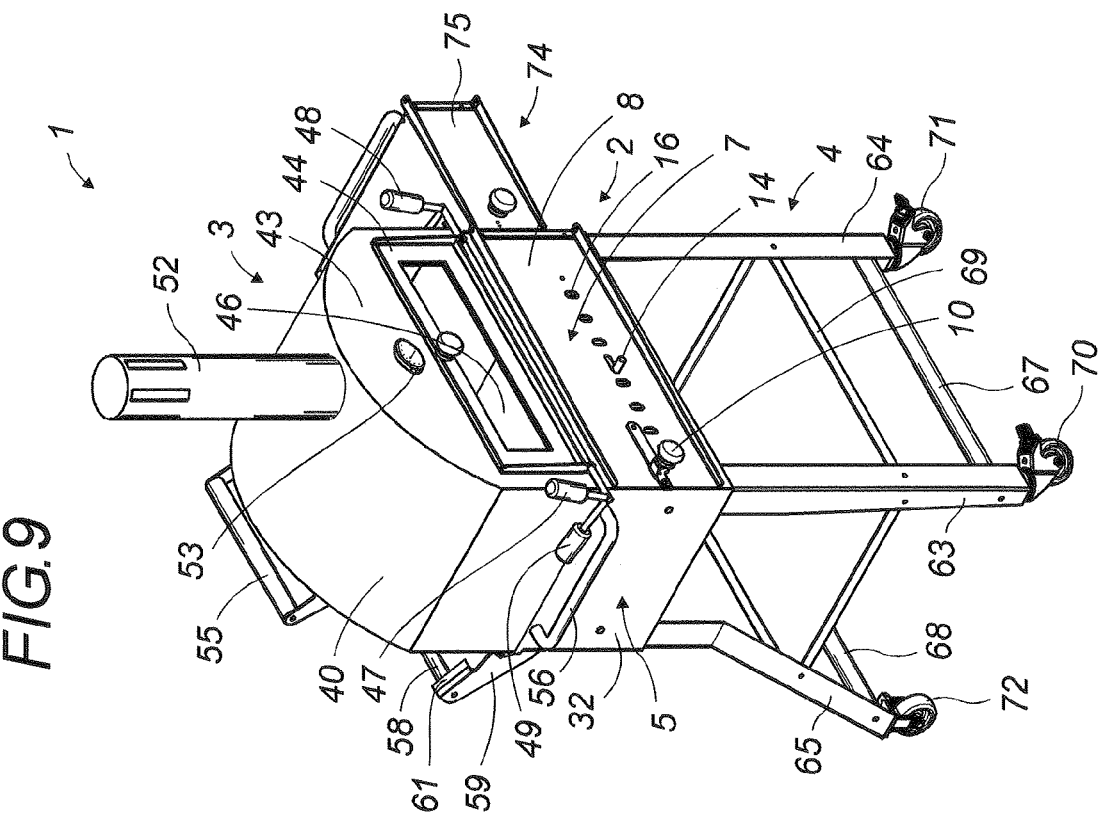
FIG. 8 is an overview of the outdoor multifunction cooking set according to the invention, provided with a temperature maintenance chamber for cooked foods, with the front door open.
Figure 9:
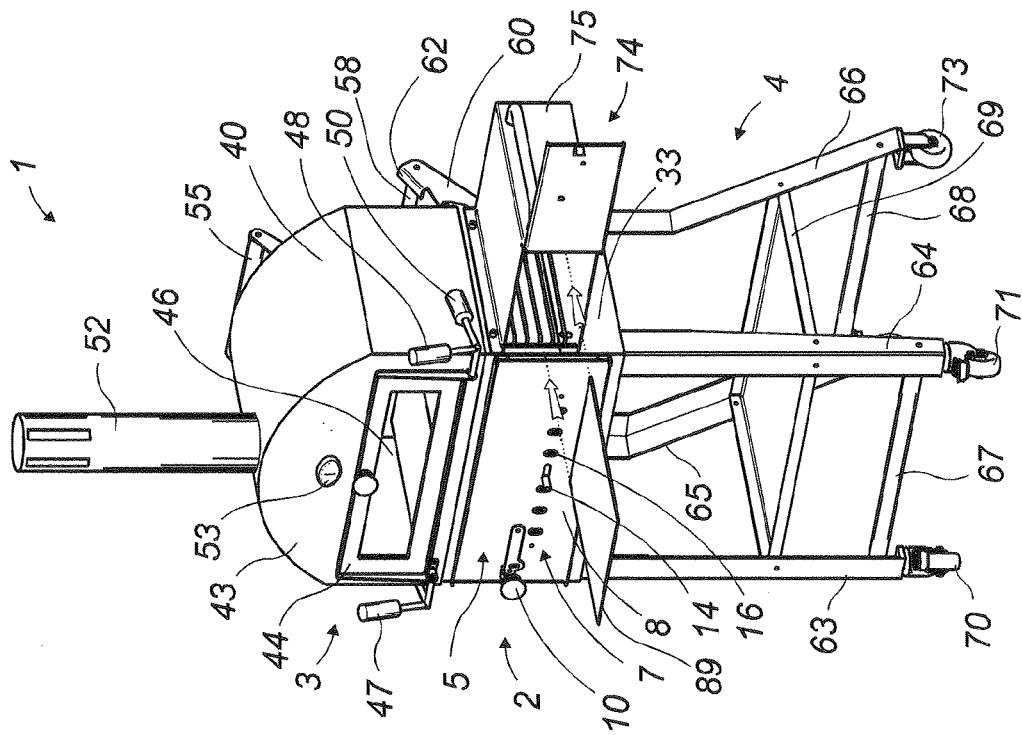
FIG. 9 is an overview of the outdoor multifunction cooking set according to the invention, provided with a temperature maintenance chamber for cooked foodstuffs, with the front door closed.

Although, in FIGS. 8 and 11, one single horizontal shelf 89 is illustrated, the temperature maintenance chamber 74 can incorporate more such shelves, depending on its size. As an example, the temperature maintenance chamber 74 illustrated in the figures can thus incorporate a maximum of five horizontal shelves 89, with the bottom 90 of the chamber 74 also being able to act as an additional horizontal shelf.

The temperature maintenance chamber 74 can incorporate a thermometer 91 that displays the temperature inside it. This thermometer 91 is preferably located on the front face 83 of the temperature maintenance chamber 74—for example, on its door 84.

The temperature maintenance chamber 74 can also incorporate an air outlet 92 designed to be opened by the user when the temperature inside the chamber 74 is too high, so as to allow the hot air inside it to escape. The air exhaust system 92 illustrated in FIG. 13 is only provided as an example, and a professional can use any other system designed to allow all or part of the hot air contained in the temperature maintenance chamber 74 to escape.

Lastly, on one of its faces—preferably on its free side 87—the temperature maintenance chamber can incorporate a handle 93 that allows one to move the outdoor multifunction cooking set 1 and/or to hang cooking utensils on it.

Figure 14:
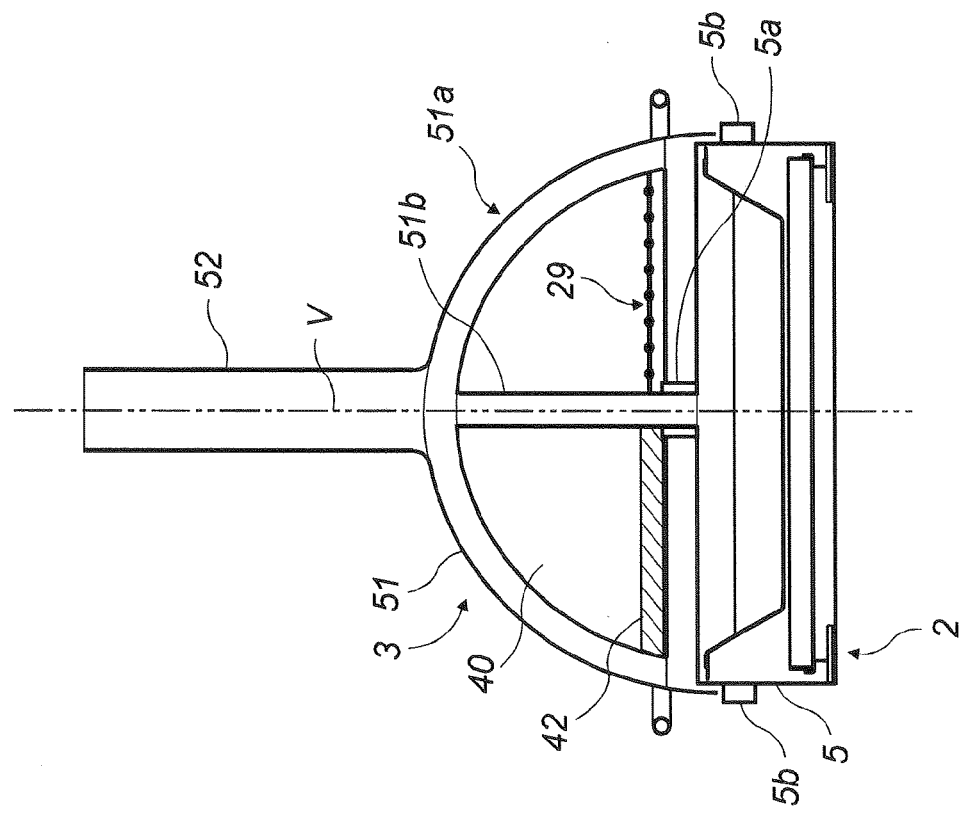
FIG. 14 is a partial schematic and sectional view of another implementation of the cooking set according to the invention.

In the example of implementation of the set in accordance with the invention and illustrated in FIG. 14, the oven 3 is mounted on the barbecue 2 by means of connection components allowing pivoting of the said oven 3 around an essentially-vertical pivoting axis V. The double wall 51 advantageously includes a double-wall portion 51b separating the metal chamber 40 from the cooking surface 29. The latter is accessible, for example, by means of an opening in another portion of double wall 51a overhanging the said cooking surface 29. As an example, the double-wall portion 51b also allows evacuation of a part of the fumes from the hearth 13, and consequently contributes to the heating of the metal chamber 40.

In the example of implementation in FIG. 14, the connection components include a central rotation shaft 5a and peripheral roller bearings 5b on which the end of the outside wall of the double wall 51. When the hearth 13 extends only into a front half of the chamber 5 facing the user, it then pivots the double wall 51, causing rotation of the oven 3 and the cooking surface 29, to use one or other of these cooking systems. As a variant, when the hearth 13 extends essentially throughout the chamber 5, it is possible to use both cooking systems simultaneously. In effect, the user pivots the double wall 51 so that either the oven 3 or the cooking surface 29 is facing him/her. He/she can thus verify the degree of cooking, for example, of pizzas in the metal chamber 40 and of articles lying on the cooking surface 29, while continuing the cooking operations. The cooking set in accordance with the invention therefore has remarkably small dimensions while allowing cooking of different nature simultaneously.

Figure 15:
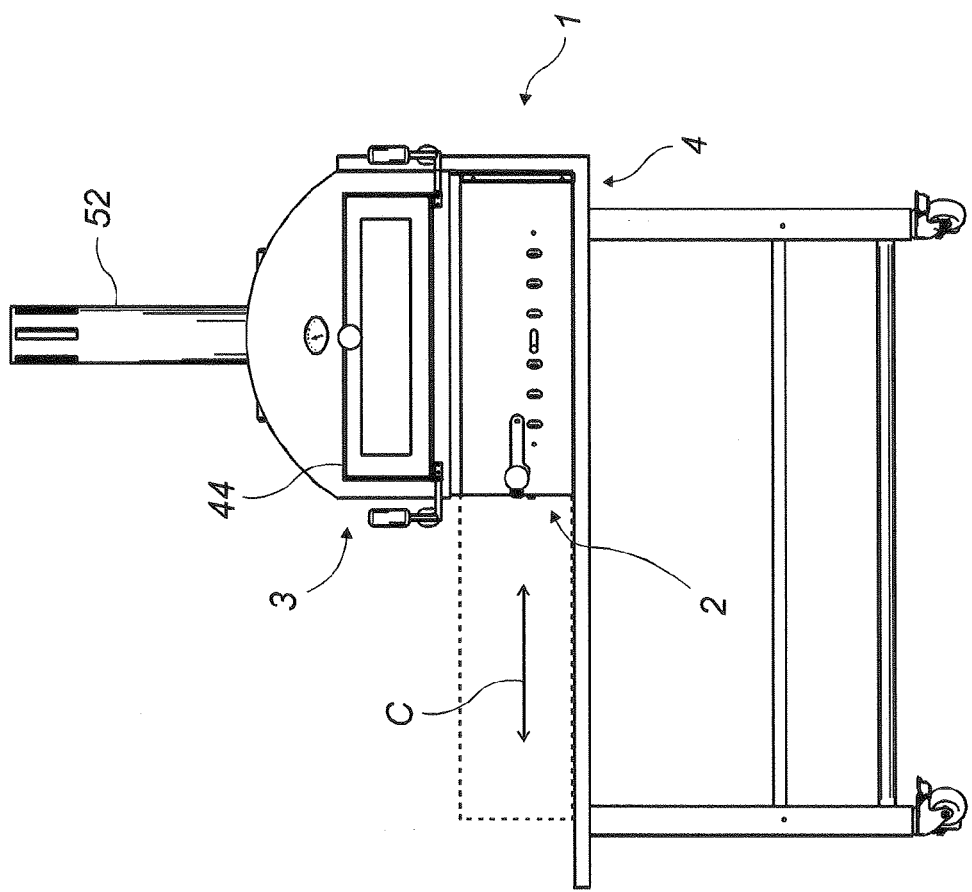
FIG. 15 is a schematic representation of another implementation of the cooking set according to the invention.

In the example of implementation of the set in accordance with the invention and illustrated in FIG. 15, the oven 3 is mounted on the barbecue 2 by means of sliding components allowing the oven 3 to slide in direction C, from the working cooking position to the position freeing-up the cooking surface 29, and vice versa. The position freeing-up the cooking surface 29 is illustrated by dotted lines in FIG. 15. The oven 3 is advantageously fixed to the frame 4, and remains in position when the barbecue 2 slides into its working position, in which the user has free access to the cooking surface 29.

Obviously, the invention is not limited to the preferential implementation described above and illustrated in the various Figures. A professional could make numerous modifications and devise other variants, without going beyond the scope of the invention.

For example, although the outdoor multifunction cooking set 1 is illustrated as a solid-fuel hearth 13—for instance, wood or charcoal—in the drawings, it is perfectly possible to adapt the cooking set according to the invention to have a hearth 13 working with gas or any other gas, liquid or solid fuel.

Similarly, in the drawings, an outdoor multifunction cooking set 1 is illustrated, allowing one to cook two pizzas simultaneously, and incorporating both a grill 30 and a "plancha" plate 31, but it is possible to design a cooking set 1 that is wider or narrower, that incorporates, for example, one or more grills 30, one or more "plancha" cooking plates, or a combination of one or more of these cooking systems 30, 31.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An outdoor multifunction cooking set composed of a barbecue and an oven, with the outdoor multifunction cooking set being mounted on a frame and comprising:
    the barbecue, incorporating a first chamber mounted on the frame, an upper face provided with a first cooking surface and a front face provided with an opening that is open to the first chamber, a door being mounted on the front face of the barbeque aligned with the opening; and
    the oven, including a second chamber having a bottom fitted with refractory stones in order to serve as a second cooking surface and a thermal inertia system,
    wherein the first chamber and the first cooking surface of the first chamber are separate from the second chamber and the second cooking surface of the second chamber, and
    wherein the entire oven, including the second chamber and the refractory stones, is pivotably mounted on the barbecue, the entire oven, including the second chamber and the refractory stones, being selectively moveable between a first position above the barbecue that allows use of the oven and the second cooking surface, and a second position that allows access to the first cooking surface of the barbecue.

2. The outdoor multifunction cooking set in accordance with claim 1 wherein the oven is mounted to pivot rearwards about a substantially horizontal pivoting axis.

3. The outdoor multifunction cooking set in accordance with claim 2 wherein the substantially horizontal pivoting axis is located at a rear upper edge of the first chamber of the barbecue.

4. The outdoor multifunction cooking set, in accordance with claim 1 wherein the second chamber of the oven has a double wall, except at the front face and at the bottom of the second chamber of the oven, with the double wall being, firstly, open at the bottom and, secondly, connected to a chimney and in communication with a hearth of the barbecue.

5. The outdoor multifunction cooking set in accordance with claim 1 wherein the first chamber of the barbecue has sides, extended by supporting side panels for a rotary spit.

6. The outdoor multifunction cooking set in accordance with claim 1 wherein the outdoor multifunction cooking set includes a chimney that is positioned off-center towards the front.

7. The outdoor multifunction cooking set in accordance with claim 1 wherein the barbecue comprises a rear face and a horizontal bar on the rear face of the barbeque, with uprights of this horizontal bar being horizontal or oblique and also acting as a travel limiter system for the oven in the second position, which is a tipped position.

8. The outdoor multifunction cooking set in accordance with claim 7 wherein the uprights of the horizontal bar comprise thrust lugs designed to act as a thrust system for a rear face of the oven when the oven is tipped rearwards.

9. The outdoor multifunction cooking set in accordance with claim 2 wherein the oven can be tipped rearwards to an angle between 50° and 70°.

10. The outdoor multifunction cooking set in accordance with claim 1 wherein the outdoor multifunction cooking set comprises at least one temperature maintenance chamber.

11. The outdoor multifunction cooking set in accordance with claim 10 wherein the temperature maintenance chamber comprises a metal chamber to be mounted or to be fixed by a fixing side of the metal chamber of the temperature maintenance chamber to one hot side of the barbecue and a door providing access to the interior of the metal chamber of the temperature maintenance chamber.

12. The outdoor multifunction cooking set in accordance with claim 11 wherein the fixing side of the metal chamber of the temperature maintenance chamber comprises horizontal edges incorporating apertures for securing the temperature maintenance chamber to the hot side of the barbeque.

13. The outdoor multifunction cooking set in accordance with claim 11 wherein vertical sides of the metal chamber of the temperature maintenance chamber located on each side of the door of the temperature maintenance chamber comprise horizontal mountings for horizontal trays designed to hold pizzas, tartes flambées or other foodstuffs.

14. The outdoor multifunction cooking set in accordance with claim 13, including the horizontal trays, wherein the horizontal trays are positioned in a removable manner on the horizontal mountings.

15. The outdoor multifunction cooking set in accordance with claim 10 wherein the temperature maintenance chamber comprises a thermometer that displays the temperature inside the temperature maintenance chamber, and an air outlet designed to be opened by an operator to allow the hot air contained in the temperature maintenance chamber to escape.

16. The outdoor multifunction cooking set in accordance with claim 1 wherein the entire oven is pivotably mounted on the barbeque by a hinge.

17. An outdoor multifunction cooking set composed of a barbecue and an oven, with the outdoor multifunction cooking set being mounted on a frame and comprising:
  the barbecue, incorporating a first chamber mounted on the frame, an upper face provided with a first cooking surface and a front face provided with an opening that is open to the first chamber, a door being mounted on the front face of the barbeque aligned with the opening; and
  the oven, including a second chamber having a bottom fitted with refractory stones in order to serve as a second cooking surface and a thermal inertia system,
  wherein the first chamber and the first cooking surface of the first chamber are separate from the second chamber and the second cooking surface of the second chamber, and
  wherein the entire oven, including the second chamber and the refractory stones, is movably mounted on the barbecue by components allowing the entire oven, including the second chamber and the refractory stones, to slide from a first position above the barbecue that allows use of the oven and the second cooking surface to a second position that allows access to the first cooking surface of the barbecue, the entire oven, including the second chamber and the refractory stones, being selectively moveable between the first position and the second position.

18. The outdoor multifunction cooking set in accordance with claim 17 wherein the entire oven, including the second chamber and the refractory stones, is movably mounted on the barbecue by components allowing the entire oven, including the second chamber and the refractory stones, to slide horizontally from the first position to the second position.

19. An outdoor multifunction cooking set composed of a barbecue and an oven, with the outdoor multifunction cooking set being mounted on a frame and comprising:
  the barbecue, incorporating a first chamber mounted on the frame, an upper face provided with a first cooking surface and a front face provided with an opening that is open to the first chamber, a door being mounted on the front face of the barbeque aligned with the opening; and
  the oven, including a second chamber having a bottom fitted with refractory stones in order to serve as a second cooking surface and a thermal inertia system,
  wherein the first chamber and the first cooking surface of the first chamber are separate from the second chamber and the second cooking surface of the second chamber, and
  wherein the entire oven, including the second chamber and the refractory stones, is pivotably mounted on the barbecue, allowing an operator to pivot the oven around a substantially vertical pivoting axis, the entire oven, including the second chamber and the refractory stones, being selectively moveable between a first position above the barbecue that allows use of the oven and the second cooking surface, and a second position that allows access to the first cooking surface of the barbecue.

* * * * *